(12) United States Patent
Indre et al.

(10) Patent No.: US 11,235,775 B2
(45) Date of Patent: Feb. 1, 2022

(54) METHOD AND DEVICE FOR DETERMINING THE CURVE OF A ROAD

(71) Applicants: PSA AUTOMOBILES SA, Poissy (FR); ROBERT BOSCH GmbH, Gerlingen-Schillerhöhe (DE)

(72) Inventors: Marius Traian Indre, Verrieres le Buisson (FR); Cosmin Dumitrescu, Paris (FR); Martial Linconnu, Paris (FR); Pierre Clement Gauthier, Boulogne Billancourt (FR); Thomas Cerny, Gerlingen-Schillerhöhe (DE)

(73) Assignees: PSA Automobiles SA, Poissy (FR); Robert Bosch GMBH, Gerlingen-Schillerhohe (DE)

( * ) Notice: Subject to any disclaimer, the term of this patent is extended or adjusted under 35 U.S.C. 154(b) by 123 days.

(21) Appl. No.: 16/800,963

(22) Filed: Feb. 25, 2020

(65) Prior Publication Data

US 2020/0331479 A1    Oct. 22, 2020

(30) Foreign Application Priority Data

Apr. 16, 2019    (EP) .................................... 19169525

(51) Int. Cl.
*B60W 40/072*    (2012.01)
*B60W 20/12*    (2016.01)

(52) U.S. Cl.
CPC .......... *B60W 40/072* (2013.01); *B60W 20/12* (2016.01); *B60W 2552/30* (2020.02)

(58) Field of Classification Search
None
See application file for complete search history.

(56) References Cited

U.S. PATENT DOCUMENTS

2012/0136549 A1* 5/2012 Bradai ............... B60W 40/072
                                                           701/93
2016/0259335 A1    9/2016 Oyama
(Continued)

FOREIGN PATENT DOCUMENTS

JP          H0727541 A   *  1/1995
JP          2001331787 A *  11/2001
WO      WO-2009097918 A2 *  8/2009   ......... G06K 9/00798

OTHER PUBLICATIONS

Noso Kazunori; Machine translation of JP-H0727541-A; Jan. 1995; espacenet.com (Year: 1995).*

(Continued)

*Primary Examiner* — David P. Merlino
(74) *Attorney, Agent, or Firm* — Sandberg Phoenix & von Gontard P.C.

(57) ABSTRACT

A method and a device are disclosed for determining data representative of the layout of a road in a two-dimensional Cartesian coordinate system, the coordinate system being associated with a vehicle travelling along the road. To this end, a first set of first points in the Cartesian coordinate system is determined on the basis of data representative of at least one image of the road environment in front of the vehicle. A second set of second points is determined in the Cartesian coordinate system on the basis of mapping data of the road environment of the vehicle. The data representative of the road layout are obtained on the basis of a part of the first points and a part of the second points.

9 Claims, 5 Drawing Sheets

(56) References Cited

U.S. PATENT DOCUMENTS

2018/0158206 A1* 6/2018 Han .................. G01C 21/32
2021/0199463 A1* 7/2021 Kitahara ............ B60W 60/001

OTHER PUBLICATIONS

Kojima, Sachiko; Machine translation of JP-2001331787-A; Nov. 2001; espacenet.com (Year: 2001).*

App Thomas; Machine translation of WO-2009097918-A2; Aug. 2009; espacenet.com (Year: 2009).*

Manolis Tsogas; Combined lane and road attributes extraction by fusing data from digital map, laser scanner and camera; Information Fusion, vol. 12, Issue 1, pp. 28-36, Jan. 2011; https://www.sciencedirect.com/science/article/pii/S1566253510000199 (Year: 2011).*

Search Report for corresponding European Application No. 19169525.3 dated Oct. 23, 2019.

* cited by examiner

[Fig. 1]
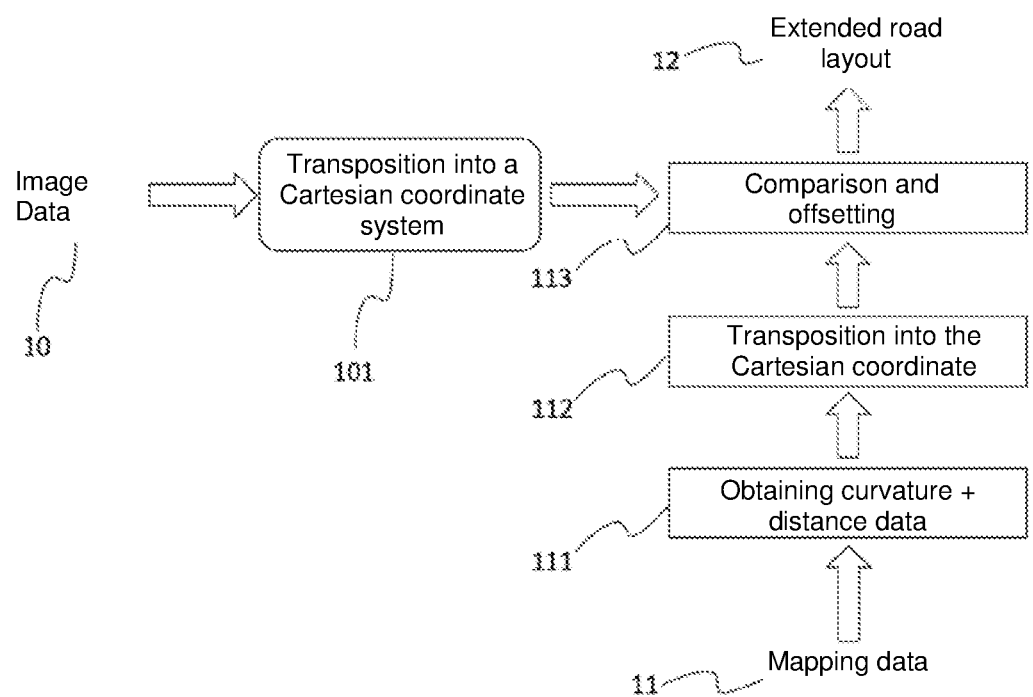
[Fig. 2]
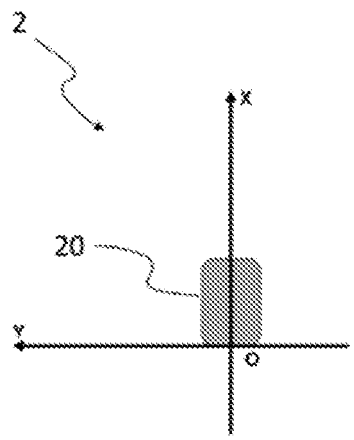

[Fig. 3]
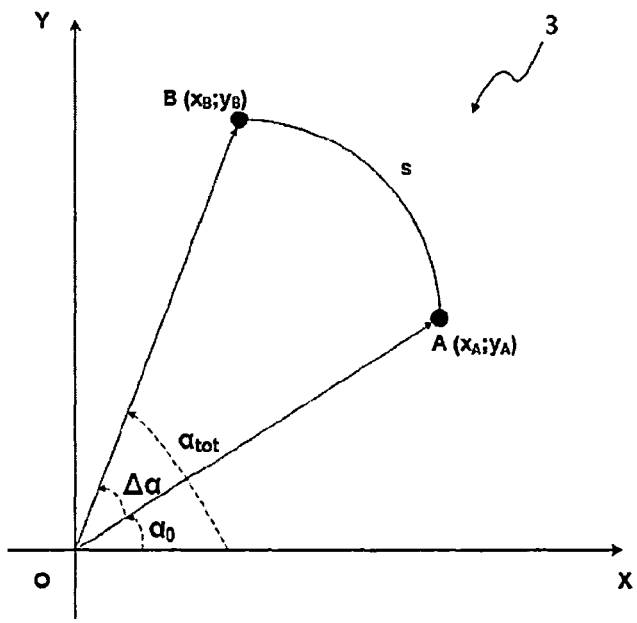
[Fig. 4]
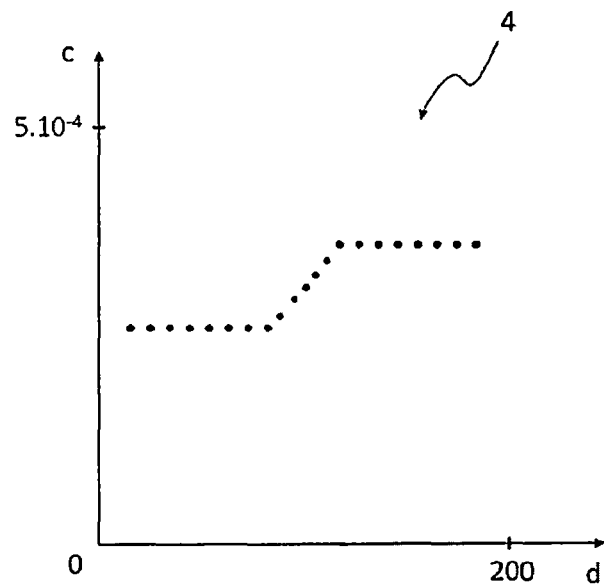

[Fig. 5]
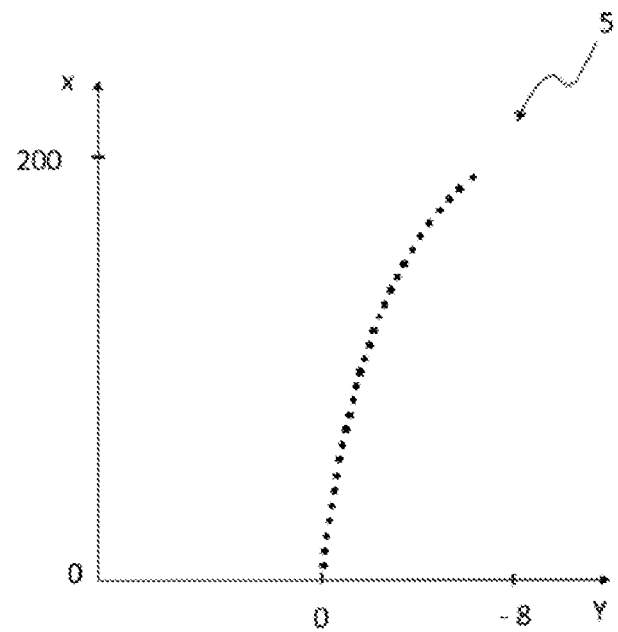
[Fig. 6]
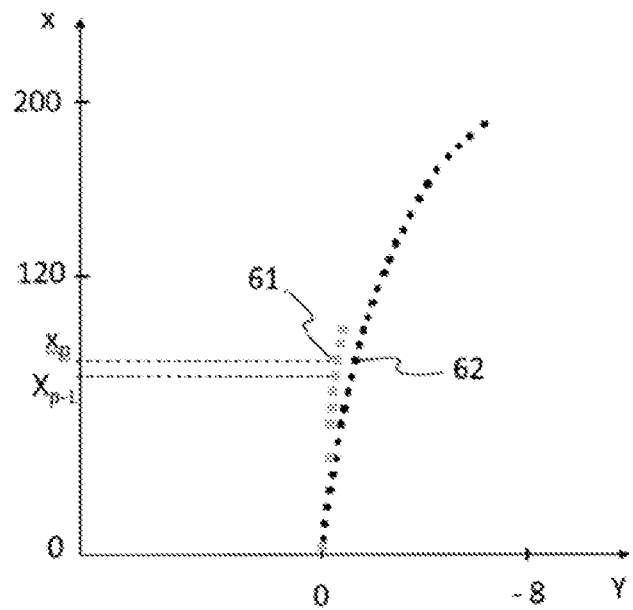

[Fig. 7]
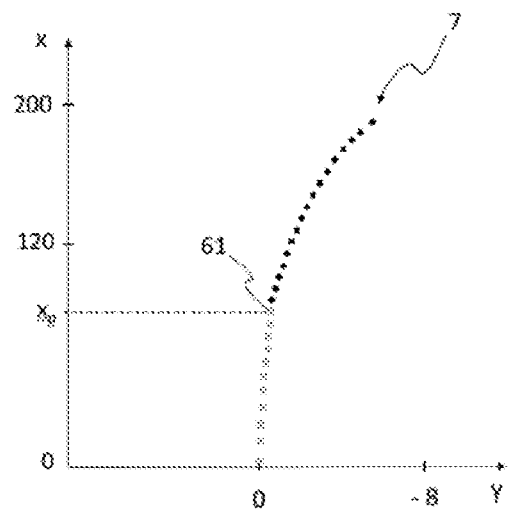
[Fig. 8]
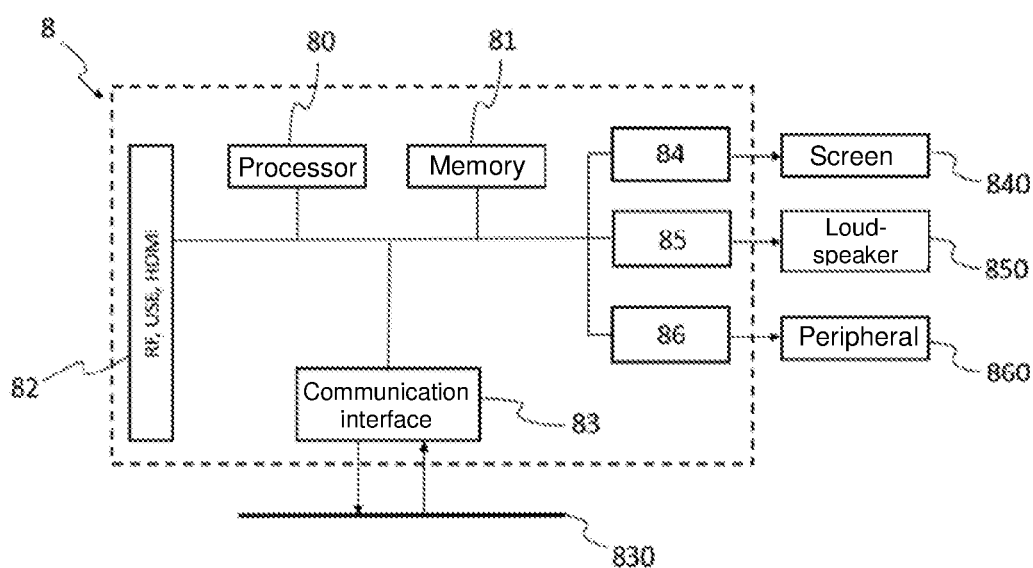

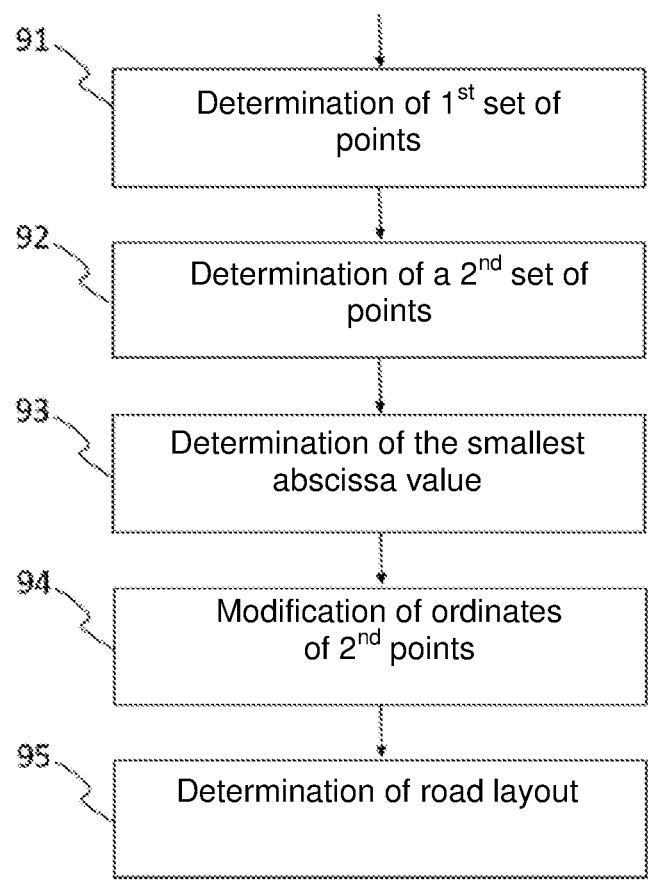

METHOD AND DEVICE FOR DETERMINING THE CURVE OF A ROAD

CROSS-REFERENCE TO RELATED APPLICATIONS

This application claims priority to European Application No. 19169525.3 filed Apr. 16, 2019, which is incorporated herein by reference.

TECHNICAL FIELD

The invention relates to systems and methods for determining the layout or curvature of a road and more particularly to a driving aid system based on the detection of the layout or curvature of the road in front of the vehicle. The invention also relates to the vehicles, for example a car, comprising such a system.

TECHNOLOGICAL BACKGROUND

Numerous driving aid systems are currently proposed with the aim of improving driving safety conditions. Some of these systems propose to assist the driver in maneuvers for changing traffic lanes, for example, in order to perform a semi-automatic lane change, at speeds that can reach 180 km/h.

So that such a maneuver can be performed safely, it is necessary to have visibility of the road and the layout of the road for a distance corresponding to 4 seconds of travel time. For a speed of 180 km/h, a travel time of 4 seconds corresponds to a distance travelled of 200 m.

Systems for detecting road-marking lines currently only enable the layout of the road or its curvature to be determined for a maximum distance of 120 m in front of the vehicle.

SUMMARY OF THE INVENTION

A solution is proposed for determining the layout of the road or its curvature for a distance appropriate for a speed exceeding 130 km/h.

According to a first aspect, a method is disclosed for determining data representative of the layout of a road in a two-dimensional Cartesian coordinate system, the coordinate system being associated with a vehicle travelling along the road, the coordinate system being defined by a longitudinal axis and a lateral axis, the method comprising the steps of:

determining a first set of first coordinate points (x1, y1) in the coordinate system on the basis of representative data of at least one image of the road environment in front of the vehicle, the first points being representative of the curvature of the road between a first minimum abscissa and a first maximum abscissa along the longitudinal axis, the first minimum abscissa corresponding to the origin of the coordinate system;

determining a second set of second coordinate points (x2, y2) in the coordinate system on the basis of mapping data of the road environment of the vehicle, the second points being representative of the curvature of the road between a second minimum abscissa and a second maximum abscissa along the longitudinal axis, the second minimum abscissa corresponding to the origin of the coordinate system and the second maximum abscissa being greater than the first minimum abscissa, each first point of the first set corresponding to a second point of the second set because the first point and the corresponding second point have the same abscissa;

determining the smallest first abscissa value for which the absolute value of the difference between the ordinate of a first point and the ordinate of the corresponding second point is greater than a threshold value;

modifying the value of the ordinate of each second point by adding the difference;

determining the data representative of the road layout on the basis of the first points of which the first abscissa is smaller than the smallest first abscissa value and on the basis of the second points of which the second abscissa is greater than the smallest first abscissa value.

According to a variation, the first set of first coordinate points is determined on the basis of a third-order polynomial function, the coefficients of the function being determined on the basis of data representative of the at least one image of the road environment in front of the vehicle.

According to yet another variation, the determination of a second set of second points comprises the following steps:

determining a set of values representative of the curvature of the road on the basis of mapping data of the road environment in front of the vehicle, each value of the set being associated with a distance in relation to the vehicle according to a different coordinate system to the two-dimensional Cartesian coordinate system;

transforming the set of values and associated distances into the second set of second points expressed in the two-dimensional Cartesian coordinate system.

According to an additional variation, the transformation comprises, for a pair of second points A and B:

integrating the curvature between the second points A and B in order to determine an angle representative of the curve;

integrating the angle representative of the curvature in order to determine an angle of curvature in the Cartesian coordinate system;

calculating the coordinates of point B on the basis of the coordinates of point A, the angle of curvature in the Cartesian coordinate system and a distance travelled between points A and B.

According to another variation, the threshold value corresponds to a percentage of the width of the road.

According to yet another variation, the width is determined on the basis of the polynomial functions representative of the left and right road markings, the markings being determined on the basis of the data representative of the at least one image of the road environment in front of the vehicle.

According to an additional variation, the first maximum abscissa is equal to 120 meters.

According to a second aspect, a device is disclosed for determining data representative of the layout of a road in a two-dimensional Cartesian coordinate system, the coordinate system being associated with a vehicle travelling along the road, the coordinate system being defined by a longitudinal axis and a lateral axis, the device comprising a memory associated with at least one processor configured to implement the steps of the method as described above according to the first aspect of the invention.

According to a third aspect, a motor vehicle is disclosed comprising the device as described above according to the second aspect of the invention.

According to a fourth aspect, a computer program is disclosed that comprises appropriate instructions for executing the steps of the method according to the first aspect, particularly when the computer program is executed by at least one processor.

Such a computer program can use any programming language, and be in source code, object code, or in an intermediate code between source code and object code, such as in a partially compiled form, or in any other desirable form.

According to a fifth aspect, a recording medium is disclosed that can be read by a computer on which is recorded a computer program comprising instructions for executing the steps of the method according to the first aspect.

On the one hand, the recording medium can be any entity or device capable of storing the computer program. For example, the medium can comprise a storage means, such as a ROM, a CD-ROM or a microelectronic-circuit ROM, or even a magnetic recording means or a hard disk.

On the other hand, this recording medium can also be a transmittable medium, such as an electrical or optical signal, such a signal being capable of being routed via an electrical or optical cable, by conventional or Hertzian radio or by a self-directed laser beam or by other means. The computer program can in particular be downloaded onto an internet type network.

Alternatively, the recording medium can be an integrated circuit in which the computer program is incorporated, the integrated circuit being appropriate to execute or be used to execute the method in question.

BRIEF DESCRIPTION OF THE FIGURES

Further features and advantages of the invention will emerge from the following description of the non-limiting embodiments of the claimed invention, with reference to the accompanying FIGS. 1 to 9, wherein:

FIG. 1 is a schematic illustration of a process to determine data representative of the layout of a road on which a vehicle is travelling;

FIG. 2 is a schematic illustration of a coordinate system associated with a vehicle travelling on the road of FIG. 1;

FIG. 3 is a schematic illustration of a step of the process of FIG. 1;

FIG. 4 is a schematic illustration of the data representative of the curvature of the road of FIG. 1 in a first coordinate system;

FIG. 5 is a schematic illustration of the data representative of the curvature of the road of FIG. 1 in the coordinate system of FIG. 2;

FIG. 6 is a schematic illustration of the comparison of two sets of data representative of the curvature of the road of FIG. 1 in the coordinate system of FIG. 2;

FIG. 7 is a schematic illustration of the combination of the two sets of data representative of the curvature of the road of FIG. 6;

FIG. 8 is a schematic illustration of a device configured to determine the data representative of the layout of a road according to the process of FIG. 1 and/or the method of FIG. 9; and FIG. 9 is a schematic illustration of a method for determining data representative of the layout of a road implemented in the device of FIG. 8.

DESCRIPTION OF THE EMBODIMENTS

A method for determining data representative of the layout and/or curvature of a road and a device implementing such a method will now be described below with reference to FIGS. 1 to 9. The same elements are identified with the same reference signs throughout the following description.

FIG. 1 is a schematic illustration of the process for determining data representative of the layout and/or curvature of a road on which a vehicle is travelling, according to a particular and non-limiting embodiment of the method. The method is implemented, for example, in one or more computers on board the vehicle. The road corresponds, for example to a traffic lane on which the vehicle is moving or to the road comprising the traffic lane in which the vehicle is moving.

Image data 10 of the road environment located in front of the vehicle are received by one or more cameras. These data correspond, for example, to RGB (Red, Green, Blue) data of pixels of one or more images acquired by the camera(s). The camera(s) are, for example, on board the vehicle and advantageously arranged on the front of the vehicle, for example in the middle of the front grille or on the windscreen. According to another example, image data 10 are acquired by a camera of a mobile device such as a Smartphone or tablet, the mobile device being, for example, on board the vehicle and arranged so as to cover the road environment located in front of the vehicle in its field of view. The viewpoint associated with the image data 10 corresponds to the viewpoint of the vehicle, that is to say that the road environment represented in the image data 10 is seen from the vehicle, in the direction of travel of the vehicle.

According to a variation, the image data 10 comprise (or are associated with) depth or distance data (expressed in meters, for example) obtained, for example, from a LIDAR (Light Detection And Ranging) type sensor.

During an operation 101, data 10 are analyzed and processed to detect the road edge or middle markings (for example the continuous or broken lines running along the edges or down the middle of the road). The data 10 are transformed or projected in order to pass from an image coordinate system to a two-dimensional Cartesian coordinate system 2 associated with the vehicle. The Cartesian coordinate system 2 is shown in FIG. 2 and has, for example, the following characteristics:

- a center O of the coordinate system located, for example, in the middle of the rear axle of the vehicle 20;
- an axis (OX) corresponding to the longitudinal axis with positive abscissa values in front of the center O in the direction of travel of the vehicle 20 and negative abscissa values behind the center O in the direction of travel of the vehicle 20;
- an axis (OY) orthogonal to the axis (OX) corresponding to the lateral axis with positive ordinate values to the left (with respect to the direction of travel of the vehicle 20) of the center O of the coordinate system and negative ordinate values to the right (with respect to the direction of travel of the vehicle 20) of the center O.

Clearly, the Cartesian coordinate system 2 can be different from that described above. For example, the center O of the coordinate system can be located at the front of the vehicle (for example in the middle of the grille or front bumper) or correspond to the location of the acquisition camera of the image data 10.

The road layout is defined according to a model obtained from the image data expressed in the Cartesian coordinate system 2, according to any method known to a person skilled in the art. The model of the road corresponds to a $2^{nd}$-order or $3^{rd}$-order polynomial function such as:

$$y_c(x_c) = C_3 * x_c^3$$

Where $(x_c, y_c)$ correspond to the coordinates of a point C of the layout or curvature of the road, expressed in the Cartesian coordinate system 2.

The polynomial function is also expressed as follows:

$$y_c(x_c)=C_3x_c^3+C_2x_c^2+C_1x_c+C_0$$

Where $C_0$, $C_1$, $C_2$ and $C_3$ correspond to the coefficients of the function obtained from the image data 10. The function is defined over a range of abscissa values between $X_{c\_min}$ and $X_{c\_max}$; where $X_{c\_min}$ is typically equal to 0 and $X_{c\_max}$ is for example equal to 50 m, 100 m, 120 m, or 140 m. Moreover, $y_c(X_{c\_min})=0$.

A first set of first coordinate points (X1, Y1) representative of the road layout (or its curvature) is thus obtained for a distance range along the longitudinal axis (OX) between $X_{c\_min}$ and $X_{c\_max}$. These first points are shown by grey squares in FIG. 6.

Mapping data 11 are received from a mapping system. The mapping data are obtained, for example, from a navigation application based on a satellite navigation system, for example of the Galileo or GPS (Global Positioning System) type. According to another example, the mapping data are received from a remote storage space (from the "cloud," for example) via a wireless connection used in a mobile network such as a 4G (or Release 10 LTE Advanced 3GPP, Version 10) or a 5G network.

During an operation 111, data representative of the curvature of the road on which the vehicle is travelling are obtained from mapping data 11. These data comprise, for example:

curvature values, corresponding to a set of discrete values of the curvature of the road, for example in front of the vehicle or around the vehicle over a set distance range;

distance values associated with the curvature values, corresponding to a set of discrete values; each value indicating, for example, the distance in meter(s) between the vehicle and the point associated with the considered curvature value of the set of discrete curvature values; this distance corresponds to a distance formed by following the layout of the road; the set of distance values is, for example, included within a range limited by a minimum value (for example −200 m, −100 m or 0 m; −200 m meaning 200 m behind the vehicle considering the direction of travel of the vehicle) and by a maximum value (for example 200 m, 500 m, 1000 m or 2000 m; 200 m meaning 200 m in front of the vehicle considering the direction of travel of the vehicle). The maximum distance value advantageously exceeds $X_{c\_max}$.

The data representative of the curvature of the road, that is to say the curvature values/associated distances values pair, form a set of points in a coordinate system corresponding to the coordinate system of the road. This set of points is represented in FIG. 4 by a curve 4 of points, the y-axis corresponding to the distance 'd' and the x-axis corresponding to the curvature 'c'.

During an operation 112, the data representative of the curvature of the road expressed in the coordinate system of FIG. 4 are transposed/projected into the Cartesian coordinate system 2. This operation 112 is illustrated in FIG. 3, which shows the determination of the second point coordinates representative of the layout of the road (or its curvature) in the Cartesian coordinate system 2 on the basis of the curvature and distance data obtained from the mapping data 11.

The curvature and distance data obtained from the mapping data 11 are transformed into a second set of second points representative of the road layout (or its curvature) in the Cartesian coordinate system 2, this second set of second points corresponding, for example, to a vector of second points with coordinates (X2, Y2) in the Cartesian coordinate system 2, that is to say along the x-axis (OX) and along the y-axis (OY). The operation 112 comprises, with reference to an example of determining the coordinates applied to 2 second points A and B:

integration of the curvature: assuming that the curvature is constant, the integration of the curvature provides the angle $\Delta\alpha$ to travel through the curve from A to B along the arc 's', i.e. $\Delta\alpha=s*curvature$;

integration of the angle $\Delta\alpha$: the integration of the angle $\Delta\alpha$ by passing through the curve from A to B provides the total angle $\alpha_{tot}$ in relation to the axis (OX) of the Cartesian coordinate system 2, i.e. $\alpha_{tot}=\alpha_0+\Delta\alpha$;

calculation of the coordinates X and Y: the coordinates $X_{2,B}$ and $Y_{2,B}$ of point B are calculated by using the coordinates $X_{2,A}$ and $Y_{2,A}$ of point A and the distance travelled (defined by $\Delta x$ and $\Delta y$) to move from point A to point B, i.e. $\Delta x=s*\cos(\alpha_{tot})$, $\Delta y=s*\sin(\alpha_{tot})$, which gives $X_{2,B}=X_{2,A}+\Delta x$ and $Y_{2,B}=Y_{2,A}+\Delta y$.

The calculation of the second set of second points is started with the coordinates of a point of origin $X_{2,0}$ and $Y_{2,0}$ with, for example, $X_{2,0}=0$ and $Y_{2,0}=0$.

By using, for example, a sampling step of 4 m, the curvature values and associated distance values are interpolated from 0 m to 200 m, for example, in order to obtain 50 discrete curvature and associated distance values, 1 value every 4 m.

A second set of second coordinate points (X2, Y2) in the Cartesian coordinate system 2 is thus obtained in order to represent the layout of the road (or its curvature) in the Cartesian coordinate system 2.

The second set of second points thus obtained is shown in FIG. 5 by a curve 5 of second points represented by black points.

During an operation 113, the first set of first points and the second set of second points are compared. The operation 113 is shown with reference to the example in FIG. 6. The first set of first points (shown by grey squares in FIG. 6) and the second set of second points (shown by black points in FIG. 6) are advantageously determined or generated so that each first point of the first set of points corresponds to one second point of the second set. A first point is said to correspond to a second point (and vice versa) when the first and second points have the same abscissa on the longitudinal axis (OX) of the Cartesian coordinate system 2.

The comparison of the first set of first points with the second set of second points includes a side-by-side comparison of the corresponding first and second points. This comparison comprises determining the first corresponding pair of points for which the absolute value for which the difference between the ordinates is greater than a set value (also called the threshold value). The comparison is made by passing through the pairs of first and second points in an increasing order of their abscissa, from the minimum abscissa value (i.e. 0) until determining the smallest abscissa value for which the corresponding pair of first and second points present a difference between their respective ordinates greater than the set value. With reference to the example in FIG. 6, the first corresponding pair of first and second points for which the absolute value of the difference between the ordinates is greater that a set value corresponds to the first point 61/second point 62, both having the same abscissa Xp. This means that the absolute value of the difference between the ordinates of the above first point/ second point pair, that is to say with the abscissa value $X_{p-1}$ immediately below $X_p$, is below the set value.

The set value (or threshold value) corresponds to a configurable value. This value corresponds, for example, to a value set by a user or to a value corresponding to a percentage of the road width (for example 3%, 5%, 7%, 10%).

On completing the comparison, the ordinates of the second points are each modified by adding the difference between the ordinates of points 61 and 62, so that the ordinate of the first point 61 is equal to the ordinate of the second point 62.

A layout of the road over a distance greater than the maximum distance obtained from the image data 10, that is to say greater than $X_{c\_max}$, is obtained by using the second points. Such a layout is obtained by combining the first points of which the abscissa is less than Xp and the second points of which the abscissa is greater than Xp. Such a combination is shown in FIG. 7 by the curve 7. The curve 7 comprises a first part comprised of first points (for the abscissae ranging between 0 and Xp) and a second part (in the extension of the first part) comprised of second points (for the abscissae ranging between Xp and the maximum distance value for which the second points were obtained from mapping data, for example 200 m).

Such a process enables the layout of the road (or its curvature) to be determined over a greater distance than the maximum distance for which it is possible to determine the layout of a road (or its curvature) from image data 10.

According to a particular embodiment, the operation 113 comprises:
  calculation of the road width: using the $C_0$ coefficients of each polynomial function modeling the left and right road markings provided by the image data 10, the road width $I_{road}$ is obtained by: $I_{road}=C_{0,left}-C_{0,right}$;
  determination of the threshold value, for example 5% of the road width, shown as $X_{5\%}$ and corresponding to Xp; this value $X_{5\%}$ corresponds to the first abscissa value for which the absolute value of the difference between the ordinates $Y_{1/5\%}$, $Y_{2/5\%}$ of the first and second points corresponding to this abscissa $X_{5\%}$ is greater than 5% of the road width, i.e. $|Y_{1/5\%}-Y_{2/5\%}|>0.05*I_{road}$;
  offsetting the second points, that is to say changing their Y2 ordinates so that $Y_{1/5\%}=Y_{2/5\%}$;
  determination of the road layout over the range (0, 200 m) by keeping the first points of which the abscissa is less than $X_{5\%}$ and by adding the second points of which the abscissa is greater than $X_5\%$, as shown in FIG. 7.

FIG. 8 is a schematic illustration of a device 8 configured to perform the operations of FIG. 1 and/or to implement the steps of the method of FIG. 9. Examples of such a device 8 comprise, without being limited thereto, different electronic devices such as a smartphone, tablet, laptop or electronic equipment on board the vehicle, for example a computer. The elements of the device 8, individually or in combination, can be integrated in one integrated circuit, in several integrated circuits, and/or in separate components. The device 8 can be made in the form of electronic circuits or software (or computer) modules or even a combination of electronic circuits and software modules.

The device 8 comprises one (or more) processors 80 configured to execute the instructions or the software module(s) on board the device 8. The processor 80 can include a built-in memory, an input/output interface, and various circuits known to a person skilled in the art. The device 8 also comprises at least one memory 81, comprised of a volatile and/or non-volatile memory, and/or comprised of a memory storage device that can comprise volatile and/or non-volatile memory, such as EEPROM, ROM, PROM, RAM, DRAM, SRAM, flash and magnetic or optical disk. The memory serves, for example, as a storage medium for the image data 10, the mapping data 11 and the coordinates of the various sets of points representative of the curvature of the road.

The computer code comprising the instructions to be loaded and executed by the processor is, for example, stored in the memory or memory storage device 81.

According to a particular and non-limiting embodiment, the device 8 comprises a block 82 of interface elements to communicate with external devices, for example the GPS or cameras. The interface elements of the block 82 comprise one or more of the following interfaces:
  Radiofrequency (RF) interface, for example of the Bluetooth® or Wi-Fi® type or of the mobile network type such as a 4G (or Release 10 LTE Advanced 3GPP, Version 10) or a 5G network.
  USB (Universal Serial Bus) interface;
  HDMI (High Definition Multimedia Interface).

According to another particular embodiment, the device 8 comprises a communication interface 83 that enables a communication to be established with other devices, for example other computers. The communication interface 83 corresponds, for example, to a transmitter configured to transmit and receive information and/or data via the communication channel 830, for example a CAN (Controller Area Network) type network. The communication interface 83 comprises, for example, a modem and/or a network card and the communication channel can, for example, be used in a wired and/or wireless medium.

According to an additional particular embodiment, the device 8 can provide output signals to one or more external devices, such as a display screen 840, one or more speakers 850 and/or other peripherals 860 (such as a projection system) via output interfaces 84, 85 and 86 respectively. According to a variation, one or other of the external devices is built into the device 8. The display screen 840 is, for example, a touchscreen or other type of screen.

FIG. 9 shows a flow diagram of the different steps of a method of determining data representative of the layout of a road. The method is implemented, for example, by the device 8. A road corresponds, for example, to a traffic lane on which a vehicle is travelling or to a set of lanes that includes the traffic lane on which a vehicle is travelling. The concept of a road is therefore to be understood in a broad sense, combining the concepts of the vehicle's lane or the set of lanes including the vehicle's lane.

In a first step 91, a first set of first points is determined. Each first point is expressed by coordinates (x1, y1) in a 2-dimensional Cartesian coordinate system associated with a vehicle travelling on the road, a first dimension corresponding to a longitudinal axis (OX) and a second dimension corresponding to a lateral axis (OY). The first set of first points is determined on the basis of data representative of at least one image of the road environment in front of the vehicle. The first points are representative of the curvature of the road between a first minimum abscissa and a first maximum abscissa along the longitudinal axis, the first minimum abscissa corresponding to the origin of the Cartesian coordinate system.

In a second step 92, a second set of second coordinate points (x2, y2) is determined in the 2-dimensional Cartesian coordinate system on the basis of mapping data of the road environment of the vehicle. The second points are representative of the curvature of the road between a second minimum abscissa and a second maximum abscissa along the longitudinal axis. The second minimum abscissa corresponding to the origin of the coordinate system and the second maximum abscissa is advantageously greater than the first minimum abscissa. Each first point of the first set corresponds to a second single point of the second set, a first point and a second point corresponding because they have the same abscissa in the 2-dimensional Cartesian coordinate system.

In a third step 93, the smallest first abscissa value for which the absolute value of the difference between the ordinate of a first point and the ordinate of the second corresponding point is greater than a threshold value is determined by comparing the first points and the second points.

In a fourth step 94, the value of the ordinate of each second point is modified by adding the value of the difference determined at step 93.

In a fifth step 95, the data representative of the layout and/or the curvature of the road are determined on the basis of the first points of which the first abscissa is less than the smallest first abscissa value (determined in step 93) and on the basis of the second points of which the second abscissa is greater than the smallest first abscissa value.

Clearly, the invention is not limited to the embodiments described above but extends to a driving aid method of a vehicle using the data representative of the road layout, and to the device configured to implement such a method.

The invention also concerns a vehicle with an on-board device configured to determine data representative of the road layout and/or the driving aid system using data representative of the road layout.

The invention claimed is:

1. A method for determining data representative of a layout of a road in a two-dimensional Cartesian coordinate system, said coordinate system being associated with a vehicle travelling along said road, said coordinate system having an origin and being defined by a longitudinal axis and a lateral axis, the method comprising the steps of:
   determining a first set of first coordinate points (x1, y1) in said coordinate system on the basis of representative data of at least one image of a road environment in front of said vehicle, said first coordinate points being representative of a curvature of the road between a first minimum abscissa and a first maximum abscissa along the longitudinal axis, said first minimum abscissa corresponding to the origin of said coordinate system;
   determining a second set of second coordinate points (x2, y2) in said coordinate system on the basis of mapping data of the road environment of said vehicle, said second coordinate points being representative of the curvature of the road between a second minimum abscissa and a second maximum abscissa along the longitudinal axis, said second minimum abscissa corresponding to the origin of said coordinate system and said second maximum abscissa being greater than said first minimum abscissa, each first coordinate point of the first set corresponding to a second coordinate point of the second set because the first coordinate point and the corresponding second point have the same abscissa;
   determining a smallest first abscissa value ($X_p$) for which the absolute value of the difference between the ordinate of a first coordinate point and the ordinate of the corresponding second coordinate point is greater than a threshold value;
   modifying the value of the ordinate of each second coordinate point of the second set by adding said difference; and
   determining said data representative of the road layout on the basis of the first coordinate points of which the first abscissa is smaller than the smallest first abscissa value and on the basis of the second coordinate points of which the second abscissa is greater than the smallest first abscissa value.

2. The method according to claim 1, whereby said first set of first coordinate points is determined on the basis of a third-order polynomial function, coefficients of said function being determined on the basis of data representative of said at least one image of the road environment in front of said vehicle.

3. The method according to claim 1, whereby said step of determining said second set of second coordinate points comprises the following steps:
   determining a set of values representative of the curvature of the road on the basis of said mapping data of said road environment in front of said vehicle, each value of said set of values being associated with a distance in relation to the vehicle according to a different coordinate system to said two-dimensional Cartesian coordinate system; and
   transforming said set of values and associated distances into said second set of second coordinate points expressed in said two-dimensional Cartesian coordinate system.

4. The method according to claim 3, whereby said transformation comprises, for a pair of second points A and B:
   integrating a curvature between the second points A and B in order to determine an angle representative of the curvature;
   integrating the angle representative of the curvature in order to determine an angle of curvature in said Cartesian coordinate system; and
   calculating the coordinates of point B on the basis of the coordinates of point A, said angle of curvature in said Cartesian coordinate system, and a distance travelled between said points A and B.

5. The method according to claim 1, whereby said threshold value corresponds to a percentage of a width of said road.

6. The method according to claim 5, whereby said width is determined on the basis of polynomial functions representative of left and right road markings, said markings being determined on the basis of the representative data of said at least one image of the road environment in front of said vehicle.

7. The method according to claim 1, whereby said first maximum abscissa is equal to 120 meters.

8. A device for determining data representative of the layout of a road in a two-dimensional Cartesian coordinate system, said coordinate system being associated with a vehicle travelling along said road, said coordinate system being defined by a longitudinal axis and a lateral axis, said device comprising a memory associated with at least one processor configured to implement the steps of the method according to claim 1.

9. A motor vehicle comprising the device according to claim 8.

* * * * *